United States Patent [19]
Bonis et al.

[11] Patent Number: 4,649,007
[45] Date of Patent: Mar. 10, 1987

[54] COEXTRUDED MULTIPLE PLASTIC LAYER SLIP PALLET

[75] Inventors: Laszlo J. Bonis, Swampscott; George V. Courville, Watertown; Samuel Opland, Newton Centre, all of Mass.

[73] Assignee: Composite Container Corporation, Medford, Mass.

[21] Appl. No.: 596,541

[22] Filed: Apr. 4, 1984

[51] Int. Cl.⁴ .................. B29C 47/06; B29C 65/66; B65D 19/00; B65D 19/36
[52] U.S. Cl. .................. 264/148; 108/51.1; 264/171; 264/230; 264/DIG. 71; 425/308; 425/462; 428/339; 428/519
[58] Field of Search ....... 264/171, 148, 230, DIG. 71; 108/51.1; 428/339, 519; 425/308, 462

[56] References Cited

U.S. PATENT DOCUMENTS

| | | | |
|---|---|---|---|
| Re. 29,192 | 4/1977 | Anderson et al. | 108/51.3 |
| 3,647,612 | 3/1972 | Schrenk et al. | 264/171 X |
| 3,993,810 | 11/1976 | Bonis | 264/171 X |
| 4,507,348 | 3/1985 | Nagata et al. | 108/51.1 X |

Primary Examiner—Philip Anderson

[57] ABSTRACT

A slip pallet made of a multiple layer coextruded sheet, one layer having more shrinkage than a layer below it to provide a natural curl to a gripping edge portion of the sheet such that in use the gripping edge portion is accessible by a gripper of a forklift.

8 Claims, 3 Drawing Figures

COEXTRUDED MULTIPLE PLASTIC LAYER SLIP PALLET

FIELD OF THE INVENTION

The invention relates to slip pallets made of plastic sheets.

BACKGROUND OF THE INVENTION

A slip pallet is a sheet that is used with a forklift having a platen that is slid under the slip pallet while a gripper of the forklift engages an upwardly inclined edge portion of the slip pallet.

Anderson et al. U.S. Pat. No. Re. 29,192 discloses slip pallets made of plastic sheets having one or more layers. The upper surface of the sheet has a higher coefficient of friction than the lower surface, and an edge portion of the sheet is bent upward at a compression-formed crease to provide an accessible tab that can be gripped.

SUMMARY OF THE INVENTION

I have discovered that a slip pallet can be simply and economically made from a multiple layer coextruded sheet having a plurality of plastic layers such that one of the layers has more shrinkage than a layer below it to provide a natural curl to the sheet so that in use an exposed edge portion of the sheet naturally curls upward and is accessible by a gripper.

In preferred embodiments one of the layers is made of polyethylene; there are two polyethylene layers and two layers made of material with more shrinkage to provide the curl; the sheet is less than 200 mils (most preferably about 20 mils) thick; the exposed edge portion has a radius of curvature of between four and nine (most preferably about six) inches; and the layer with more shrinkage comprises reground scrap plastic including polyethylene and an acrylonitrile containing polymer.

DESCRIPTION OF THE PREFERRED EMBODIMENT

The structure, manufacture and use of the preferred embodiment of the invention will now be described after first briefly describing the drawings.

DRAWINGS

STRUCTURE

Figure 1:
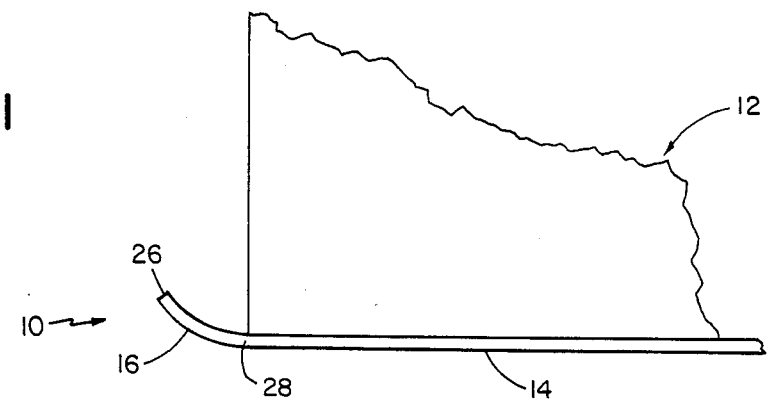
FIG. 1 is a diagrammatic partial elevation showing a slip pallet according to the invention in use underneath a cardboard box load.

Referring to FIG. 1, there is shown slip pallet 10 supporting cardboard box 12 on its central portion 14. Gripping edge portion 16 of slip pallet 10 is not restrained by box 12 and curves upward naturally.

Figure 2:
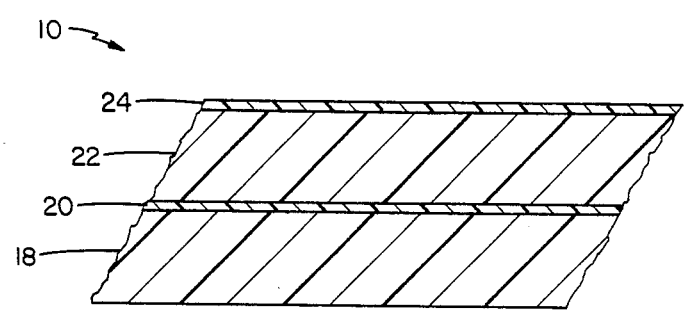
FIG. 2 is an enlarged diagrammatic vertical sectional view of a portion of said slip pallet.

Referring to FIG. 2, it is seen that slip pallet 10 includes nine mil thick lower slip layer 18 of high density polyethylene (available under the trade designation Poly-ETH Hi-D 9118T from Gulf Oil Chemicals Company), one mil thick intermediate layer 20 of reground, repelletized scrap plastic (including acrylonitrile-methyl acrylate copolymer available under the Barex trade designation, polyethylene available under the Norchem NPE 983, 940, or 320 trade designations and small amounts of adhesive tie layer material), nine mil thick intermediate layer 22 of the same high density polyethylene as in layer 18, and one mil thick upper nonslip layer 24 of the same scrap plastic as in layer 20. The scrap in layers 20, 24 typically has a polyethylene to acrylonitrile-methyl acrylate copolymer ratio of approximately 2:1 and can vary between 3:1 and 1:3.

Slip pallet 10 is 43 or 40 inches wide and 51 or 53 inches long. Gripping edge portion 16 is approximately three inches wide and has a radius of curvature of about six inches. Its free end 26 makes about a 20° angle with portion 28, which is held down by the edge of box 12. Central portion 14 of slip pallet 10 is generally flat and does not curl when box 12 is not on it, because the weight of the sheet causes it to flatten out, making it easy to handle.

MANUFACTURE

Figure 3:
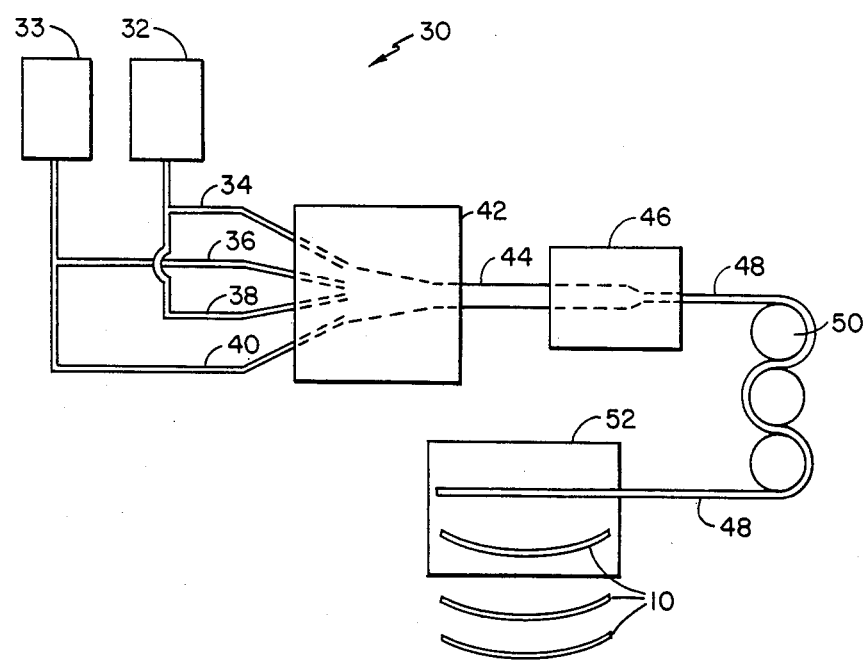
FIG. 3 is a diagrammatic view of a process of manufacturing the FIG. 1 slip pallet.

Referring to FIG. 3, there is shown apparatus 30 for manufacturing slip pallet 10. Two heated containers 32, 33 serve as sources of the polyethylene and scrap plastic respectively. Conduits 34, 36, 38, 40 supply the heated materials to coextrusion block 42. There the materials merge together to form under pressure unitary, four-layer thick stream 44 of generally circular cross section. Stream 44 passes into extrusion die 46 (e.g., Welex standard 54 inch flex-lip die) for extrusion into continuous sheet 48. Sheet 48 then passes through a series of chill rolls 50. After emerging from chill rolls 50, sheet 48 passes through cutter 52, in which the individual slip pallets 10 are cut. Slip pallets 10 have a natural curl, because scrap plastic layers 20, 24 have more shrinkage during cooling than polyethylene layers 18, 22.

USE

Slip pallets 10 are used in a manner similar to that described in the above-mentioned patent, which is hereby incorporated by reference. In use, because the surface of scrap upper nonslip layer 24 is tackier than the surface of polyethylene lower slip layer 18, it has a higher coefficient of friction than polyethylene lower layer 18, and lower layer 18 slides over a platen of a forklift during use while upper layer 24 does not slip relative to box 12. Because the slip pallet does not have a crease to provide the upwardly inclined gripping portion, it is not weakened at portion 28.

OTHER EMBODIMENTS

Other embodiments of the invention are within the scope of the following claims. For example, other polyethylenes and other materials and numbers of layers and thicknesses of layers can work so long as the overall sheet has sufficient strength to act as a slip pallet, at least one layer has more shrinkage than a layer below it to provide the natural curl, and the upper surface has a higher coefficient of friction than the lower surface. The slip pallet can be made of only two layers if the lower layer has the desired slip surface, the upper layer has the desired nonslip surface, and the differential shrinkage between the two is sufficient to provide the curl for the gripping edge portion.

Examples of some other plastics that will provide sufficient strength to the sheet are polypropylene, polyethylene terepthalate, glycol-modified polyethylene terepthalate, nylon, ultrahigh molecular weight polyethylene, and polycarbonate. Where these plastics would not be slippery enough to act as a lower slip layer, an additional one mil thick lower layer of polyethylene, polypropylene or other plastic with the desired slip properties could cover the structural layer and provide the desired low friction surface.

Examples of other plastics that would have the desired nonslip surface properties for the upper surface are ethylene-vinyl acetate copolymer, ethylene-methyl acrylate copolymer, and ionomer (available under the trade designation Surlyn).

The radius of curvature can be other than six inches so long as the radius is small enough that free end 26 is sufficiently above portion 28 to be engaged by a gripper, and the radius is not so small as to cause free end 26 to be contacting or close to box 12, thus preventing gripping. Radii of curvature between four and nine inches are preferred to provide proper positioning of edge portion 16 for gripping by many existing forklifts. The curvature can be easily varied by changing the relative thicknesses of the plastics, or by using different plastics. The sheet can be of a different thickness, e.g., between 10 and 200 mils thick, depending upon the application.

What is claimed is:

1. A method of making slip pallets comprising coextruding a sheet comprising a plurality of plastic layers including an upper nonslip layer of a first plastic and a lower slip layer of second plastic, the exposed upper surface of said upper nonslip layer having a coefficient of friction higher than that of an exposed lower surface of said lower slip layer, to cause said lower surface to slide relative to a platen and said upper surface to frictionally engage boxes on it, one layer of said plurality of layers having more shrinkage than a layer below said one layer to provide a natural curl to gripping edge portions of said slip pallets such that in use said gripping edge portions of said slip pallets are accessible by a gripper of a forklift, and cutting said sheet into individual slip pallets that are larger than the boxes to be supported to provide said gripping edge portions.

2. The method of claim 1 wherein said second plastic comprises polyethylene.

3. The method of claim 2 wherein said first plastic comprises one of the group including ethylene-vinyl acetate copolymer, ethylene-methyl acrylate copolymer, ionomer, and scrap plastic including polyethylene and acrylonitrile containing polymer.

4. The method of claim 1 wherein said plurality of plastic layers comprises four layers.

5. The method of claim 4 wherein said first plastic in said upper nonslip layer comprises scrap plastic including polyethylene and acrylonitrile containing polymer, said second plastic in said lower slip layer comprises polyethylene, said plurality of plastic layers comprises an intermediate layer of said scrap plastic above said lower nonslip layer of polyethylene, and an intermediate layer of polyethylene above said intermediate layer of scrap plastic and below said upper layer of scrap plastic.

6. The method of claim 1 wherein said plurality of layers comprises a layer comprising one of the group of polyethylene, polypropylene, polyethylene terepthalate, glycol-modified polyethylene terepthalate, nylon, ultrahigh molecular weight polyethylene, and polycarbonate.

7. The method of claim 1 wherein said gripping edge portion has a radius of curvature between four and nine inches.

8. The method of claim 1 wherein said sheet is less than 200 mils thick.

* * * * *